US012443591B2

(12) United States Patent
Kumar et al.

(10) Patent No.: US 12,443,591 B2
(45) Date of Patent: Oct. 14, 2025

(54) SYSTEMS AND METHODS FOR PROVIDING RECOMMENDATION TO MODIFY DEFICIENT CONTENT ITEM

(71) Applicant: Adeia Guides Inc., San Jose, CA (US)

(72) Inventors: Vijay Kumar, Karnataka (IN); Rajendran Pichaimurthy, Karnataka (IN); Madhusudhan Srinivasan, Bangalore (IN); Prakash Viswanathan, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/772,671

(22) Filed: Jul. 15, 2024

(65) Prior Publication Data

US 2025/0021545 A1 Jan. 16, 2025

Related U.S. Application Data

(63) Continuation of application No. 17/859,621, filed on Jul. 7, 2022, now Pat. No. 12,067,002, which is a continuation of application No. 17/065,998, filed on Oct. 8, 2020, now Pat. No. 11,416,479.

(51) Int. Cl.
*G06F 16/00* (2019.01)
*G06F 16/23* (2019.01)
*G06F 16/245* (2019.01)

(52) U.S. Cl.
CPC ........ *G06F 16/2379* (2019.01); *G06F 16/245* (2019.01)

(58) Field of Classification Search
None
See application file for complete search history.

(56) References Cited

U.S. PATENT DOCUMENTS

| | | | |
|---|---|---|---|
| 6,029,165 A | 2/2000 | Gable | |
| 7,962,504 B1 | 6/2011 | Mehanna | |
| 10,929,613 B2 | 2/2021 | Dobrynin et al. | |
| 11,176,126 B2 | 11/2021 | Wurzel et al. | |
| 11,416,479 B2 | 8/2022 | Kumar et al. | |
| 12,067,002 B2 | 8/2024 | Kumar et al. | |
| 2010/0153128 A1 | 6/2010 | Carmel et al. | |
| 2011/0238631 A1* | 9/2011 | Cortes | G06F 16/48 707/E17.143 |
| 2014/0101112 A1* | 4/2014 | Bantivoglio, III | G06F 16/215 707/691 |

(Continued)

*Primary Examiner* — Anhtai V Tran
(74) *Attorney, Agent, or Firm* — HALEY GUILIANO LLP

(57) ABSTRACT

Systems and methods are disclosed herein for providing a recommendation to modify deficient a deficient content item. A plurality of content items associated with a topic is retrieved. Each of the content items includes a plurality of portions each associated with a respective sub-topic. A rating for each sub-topic of the content items is calculated, and a minimum viable subset of the sub-topics is identified based on the calculated ratings. A new content item associated with the topic is accessed. A plurality of portions of the new content item is identified and a sub-topic for each identified portion is determined. An omitted sub-topic of the minimum viable subset of the sub-topics that is not included in the sub-topics of the new content item is identified, and the system interrupts upload of the new content and recommends modifying the new content item to include a portion with the omitted sub-topic.

20 Claims, 9 Drawing Sheets

(56) References Cited

U.S. PATENT DOCUMENTS

2021/0232577 A1* 7/2021 Ogawa ................. G06V 40/174
2022/0114162 A1 4/2022 Kumar et al.
2023/0082818 A1 3/2023 Kumar et al.

* cited by examiner

SYSTEMS AND METHODS FOR PROVIDING RECOMMENDATION TO MODIFY DEFICIENT CONTENT ITEM

CROSS-REFERENCES TO RELATED APPLICATION

This application is a continuation of U.S. patent application Ser. No. 17/859,621, filed Jul. 7, 2022, which is a continuation of U.S. patent application Ser. No. 17/065,998, filed Oct. 8, 2020, now U.S. Pat. No. 11,416,479, each of which are hereby incorporated by reference herein in their entireties.

BACKGROUND

The present disclosure is directed to techniques for providing a recommendation, and more particularly to techniques for providing a recommendation to modify a deficient content item.

SUMMARY

Content creators may spend a significant timing creating a content item (e.g., an e-learning course, a documentary, a collection of media items, etc.) about a particular topic. If, however, a content item fails to include popular sub-topics of a particular topic or content related to the popular sub-topics, consumers may lose interest in the content item and/or provide a low ranking of the content item. However, it is often not clear which sub-topics are missing. In an approach, a creator may find out that the content item is deficient simply by posting it to be accessed by other users and monitoring feedback. Eventually, content items with missing topics will have low content rankings and negative comments. This technique is time-consuming and inefficient because it relies on a manual review of the material. Further, valuable storage and network resources may be wasted by hosting content items that are deficient.

Accordingly, to solve this problem, systems and methods are provided that are capable of analyzing a new content item for deficiencies (e.g., missing content). In particular, a content analysis application may retrieve a plurality of content items, each of which is associated with a particular topic and includes a plurality of portions, each of which is associated with a respective sub-topic. The content analysis application may calculate a rating for each sub-topic of the plurality of content items and identify a minimum viable subset of the sub-topics of the plurality content items based on the calculated ratings for each sub-topic of the plurality of content items. When a new proposed content item on the particular topic is received with a request to be posted (e.g., be made available to other users via a network), the content analysis application may access the new proposed content item, identify a plurality of portions of the new content item, and determine a sub-topic for each portion of the plurality of portions of the new content item. The content analysis application checks if the new proposed content item included the identified minimum viable subset of sub-topics for the particular topic. If not, the content analysis application may stop the posting process and/or alert the creator that the proposed content is deficient. This solves the problem of wasting valuable storage and network resources hosting content items that are deficient. The deficiency may be further be identified to the user. In some embodiments, the content analysis application may also generate for display one or more examples of content portions (e.g., from previously uploaded content that correspond to the missing sub-topics of the new content item). This solves the problem of the creator not knowing the sub-topics that are missing, before the creator posts the deficient content item.

In some embodiments, the content analysis application may process each of the plurality of content items to identify the plurality of portions in the content item and determine a respective sub-topic for each of the plurality of portions by identifying keywords in each of the plurality of portions, accessing a database including a plurality of sub-topics each stored in association with a plurality of keywords, comparing the identified keywords with the plurality of keywords associated with each of the plurality of sub-topics, and determining the respective sub-topic for each of the plurality of portions based on the comparing.

In some embodiments, the content analysis application, when calculating the rating for each sub-topic of the plurality of content items, may retrieve a rating for each of the plurality of content items, and calculate the rating for each sub-topic of a respective content item based on the retrieved rating for the content item. Retrieving the rating for each of the plurality of content items may include retrieving the rating for each of the plurality of content items from a social media platform. Identifying the minimum viable subset of the sub-topics of the plurality of content items based on the calculated ratings for each sub-topic of the plurality of content items may include identifying important sub-topics, among the sub-topic of the plurality of content items, having a rating greater than or equal to a threshold level among the calculated ratings, and identifying common sub-topics, among the identified important sub-topics, that are included in at least two content items of the plurality of content items as the minimum viable subset of the sub-topics of the plurality of content items.

In some embodiments, the recommendation to modify the new content item to include the portion with the omitted sub-topic may include a link to a portion, of the plurality of portions, associated with the omitted sub-topic.

In some embodiments, the content analysis application may identify an included sub-topic of the minimum viable subset of the sub-topics that is included in the sub-topics of the new content item, process content, of each of the plurality of content items that is included in the included sub-topic and of the new content item that is included in the included sub-topic, to identify omitted content of each of the plurality of content items that is not included in the new content item, and in response to identifying the omitted content, transmit for display a recommendation to modify the content of the new content item to include the omitted content.

In some embodiments, each of the plurality of content items may be an online learning course about the topic. In some embodiments, each of the plurality of content items may be a collection of media content items about the topic.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
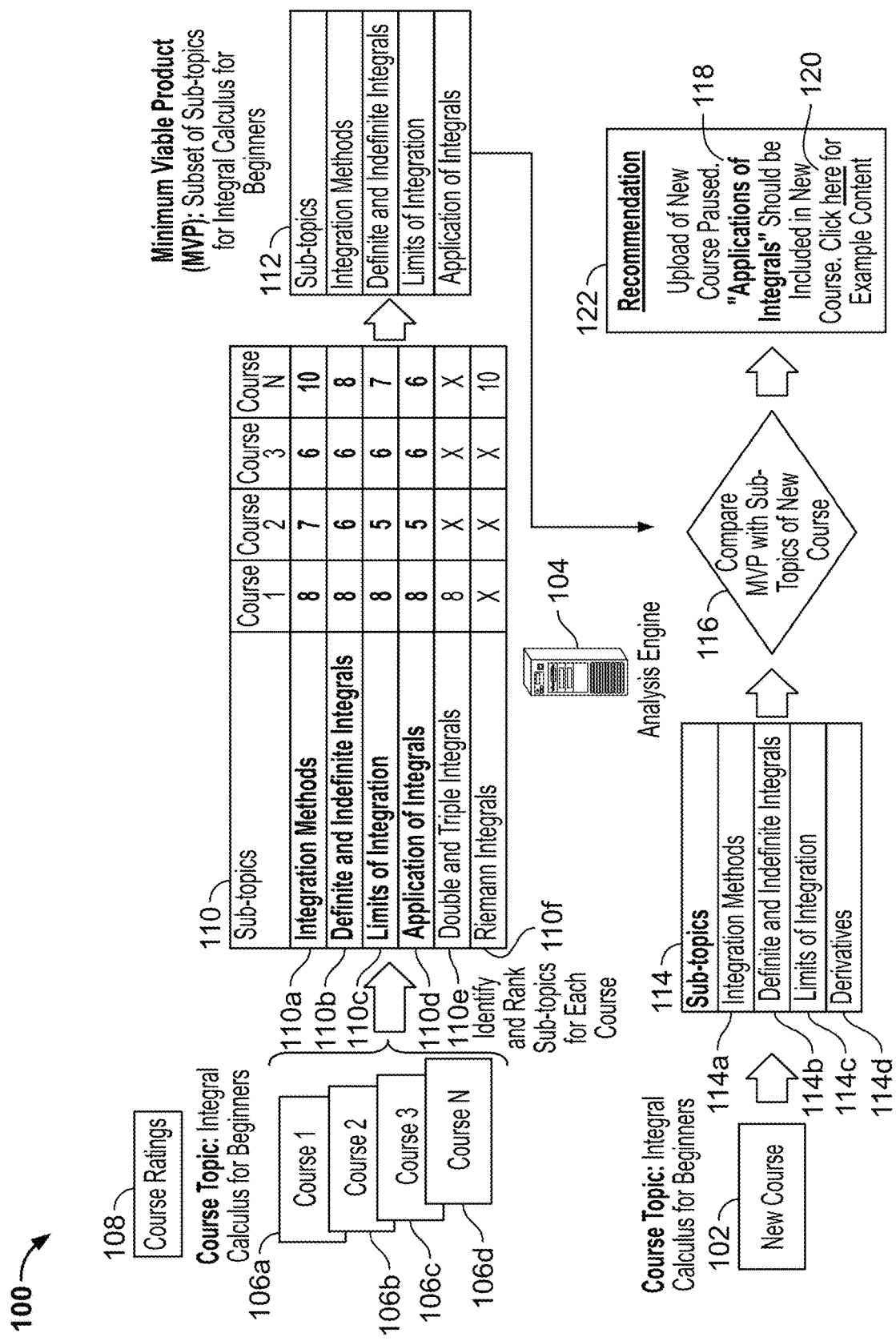
FIG. 1 shows an illustrative diagram for making a recommendation to modify a new course to include a portion with an omitted sub-topic, in accordance with some embodiments of the disclosure.

FIG. 1 shows an illustrative diagram 100 for making a recommendation to modify a new course to include a portion with an omitted sub-topic, in accordance with some embodiments of the disclosure. In some embodiments, the new course 102 (i.e., new content item) may be an electronic course, an online course, etc. However, this is only an example, and the new course 102 may be any content item (e.g., a collection of media content items, a book, etc.) about a particular topic. As shown, the new course 102 is a course about integral calculus for beginners. However, this is only an example and the new course 102 may be about any topic (e.g., machine learning, Italian cooking, etc.).

An analysis engine 104 may analyze a plurality of courses (106a, 106b, 106c . . . 106n) about integral calculus for beginners (i.e., the same topic as the new course 102 to be analyzed) to identify and rank sub-topics in each course. For example, as described in greater detail below with reference to FIGS. 4A and 4B, the analysis engine 104 may parse content of each of the plurality of courses 106 to identify the plurality of sub-topics covered in each course. The analysis engine 104 may calculate a rating for each of the identified plurality of sub-topics based on retrieved course ratings 108 corresponding to the plurality of courses 106, and generate a table 110 of the ranked plurality of sub-topics in the plurality of courses 106. For example, as shown, the analysis engine 104 may identify four sub-topics (i.e., "integration methods" 110a, "definite and indefinite integrals 110b, "limits of integration" 110c, and "application of integrals" 110d) that are included in all of the plurality of courses 106. The analysis engine 104 may also identify sub-topics that are included in some but not all of the plurality of courses 106 (i.e., "double and triple integrals" 110e in course one 106a, and "Riemann integrals" 110f in course two 106b). The analysis engine 104 may calculate a rating associated with each of the identified sub-topics in each of the plurality of courses 106 (e.g., a rating from one-ten with ten being the highest rating).

The analysis engine 104 may identify, based on the table 110 of the ranked plurality of sub-topics in the plurality of courses 106, a minimum viable product (MVP) 112 for any courses about the particular topic (i.e., integral calculus for beginners). For example, the analysis engine 104 may identify a subset of the sub-topics included in the table 110 of the ranked plurality of sub-topics the MVP 112 (i.e., the sub-topics should be included in any course about integral calculus for beginners). As shown, the analysis engine 104 may identify the sub-topics that are included in all of the plurality of courses 106 with having a rating of five or greater as the sub-topics that should be included in any course about integral calculus for beginners (i.e., "integration methods" 110a, "definite and indefinite integrals 110b, "limits of integration" 110c, and "application of integrals" 110d). As shown, the analysis engine 104 may exclude sub-topics that are not included in all of the plurality of courses 106 (i.e., "double and triple integrals" 110e and "Riemann integrals" 110f). However, this is only one example, and the analysis engine 104 may identify the sub-topics that should be included in the MVP 112 in any suitable manner. For example, in some embodiments, the analysis engine 104 may utilize a neural net or machine learning model that accepts as input content with sub-topics and that identifies the MVP 112. In some embodiments, the analysis engine 104 may include sub-topics having at least a certain minimum rating (e.g., five) that are included in a majority of the plurality of courses 106 (e.g., more than half but less than all of the plurality of courses 106). In some embodiments, if there is a large number of courses about the particular topic, the analysis engine 104 may identify the common sub-topics in the ten highest rated courses among the courses about integral calculus for beginners (e.g., the highest overall ratings). The MVP 112 for integral calculus for beginners may be stored in a database and periodically updated, as described in further detail below.

The analysis engine 104 may analyze the new course 102 to identify the sub-topics in the new course 102. In some embodiments, the analysis engine 104 may analyze the new course 102 when the new course 102 is being submitted from one device (e.g., a computing device 122) for hosting on a server (e.g., to be available to a plurality of other users). As described in greater detail below, if the MVP 112 is not met, the upload of the new course 102 may be interrupted until the new course 102 is revised to include omitted content, thereby saving networking and hosting resources by not uploading deficient content. In some embodiments, to analyze the new course 102, the analysis engine 104 may parse the content of the new course 102 to identify a plurality of sub-topics (i.e., "integration methods" 114a, "definite and indefinite integrals" 114b, "limits of integration" 114c, and "derivatives" 114d). The analysis engine 104 may store the plurality of sub-topics (114a-114d) in a table 114. The analysis engine 104 may compare, at step 116, the plurality of sub-topics (114a-114d) in table 114 with the sub-topics stored in the MVP 112 to determine if the new course 102 is missing any sub-topics that should be included in the new course 102. For example, as shown, based on the comparison, the analysis engine 104 may determine that "applications of integrals" 110d should be included in the new course 102 and provide a recommendation 118 to include the missing sub-topic. In some embodiments, the recommendation 118 may include a link 120 to the missing content (e.g., a link to content from one or more of the plurality of courses 106 that corresponds to the sub-topic "applications of integrals" 110*d*). The analysis engine 104 may provide the recommendation 118 to the computing device 122 of the content creator of the new course 102, so that the content creator can update the new course 102 with the missing content before the new course 102 is made available to content consumers (e.g., by a content provider). In some embodiments, the recommendation 118 may include suggestions for including certain highly rated sub-topics that were not included in the MVP 112, but that may be of interest to a consumer of the new course 102 (e.g., "Riemann integrals" 110*f* having a ranking of "ten"). For example, analysis engine 104 may provide a link or links directly to sub-topic "Application of Integrals" of one or more of already available courses 106*a*-106N. In some embodiments, if the upload of the new course 102 is stopped, the recommendation 118 may include a notification that the upload has been paused and to update the new course 102 before trying to continue the upload of the new course 102.

Figure 2:
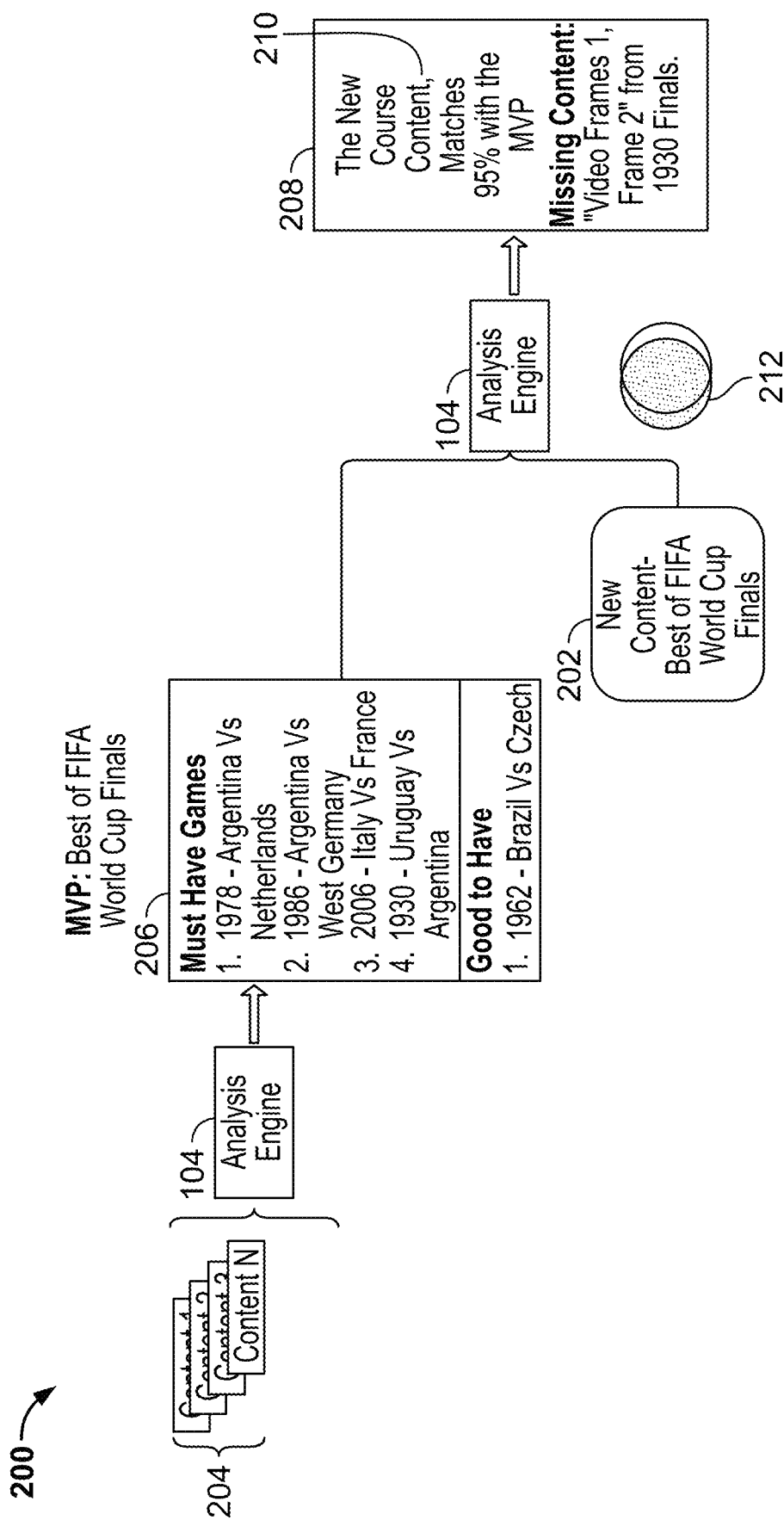
FIG. 2 shows an illustrative diagram for making a recommendation to modify a new content item to include a portion with an omitted portion of a game, in accordance with some embodiments of the disclosure.

FIG. 2 shows an illustrative diagram 200 for making a recommendation to modify a new content item to include a portion with an omitted portion of a game, in accordance with some embodiments of the disclosure. As shown, new content item 202 is a collection of games of "the best of the FIFA World Cup finals." As similarly described above with reference to FIG. 1, the analysis engine 104 may analyze a plurality of content items 204 having collections of games of the best of the FIFA World Cup finals to identify and rank the games in the plurality of content items 204. Based on the identified and ranked games, the analysis engine 104 may identify games to include in MVP 206 (i.e., the games should be included in any content item about the best games of the FIFA World Cup finals). For example, as shown, the MVP 206 may include the following games: "1978—Argentina vs. Netherlands," "1986—Argentina vs. West Germany," 2006—Italy vs. France," and "1930—Uruguay vs. Argentina").

The analysis engine 104 may compare the MVP 206 to identified games in the new content item 202 and generate a recommendation 208 based on the comparison. For example, as shown, if the analysis engine 104 determines that the new content item 202 does not include a portion (e.g., video frames one and two) of the game "1930—Uruguay vs. Argentina'), the analysis engine 104 may include this missing portion in the recommendation 208. In some embodiments, the recommendation 208 may include additional information 210 (e.g., "the new content matches with 95% of the MVP content"). In some embodiments, the additional information 210 may be represented by an illustration (e.g., a Venn diagram 212 showing the overlap between the new content item 202 and the MVP 206).

In some embodiments, the analysis engine 104 may also identify game(s) that are not included in the MVP 206, but that may be of interest to a consumer. For example, as shown, the analysis engine 104 may identify the game "1962—Brazil vs. Czech" as a game that may be included as a secondary recommendation (e.g., if the new content item 202 does not include much content). In some embodiments, secondary recommendations may be provided only to certain content creators based on a profile of the content creator of the new content item 102, the content platform hosting the new content item 102, the language of the new content item 102, the expected content consumers of the new content item 102, etc. For example, if Brazil soccer fans are expected to consume the new content item 102, the second recommendation of the game "1962—Brazil vs. Czech" may be included in the recommendation 208. The analysis engine 104 may provide the recommendation 208 to a device the content creator of the new content item 202 (e.g., the computing device 122).

Figure 3:
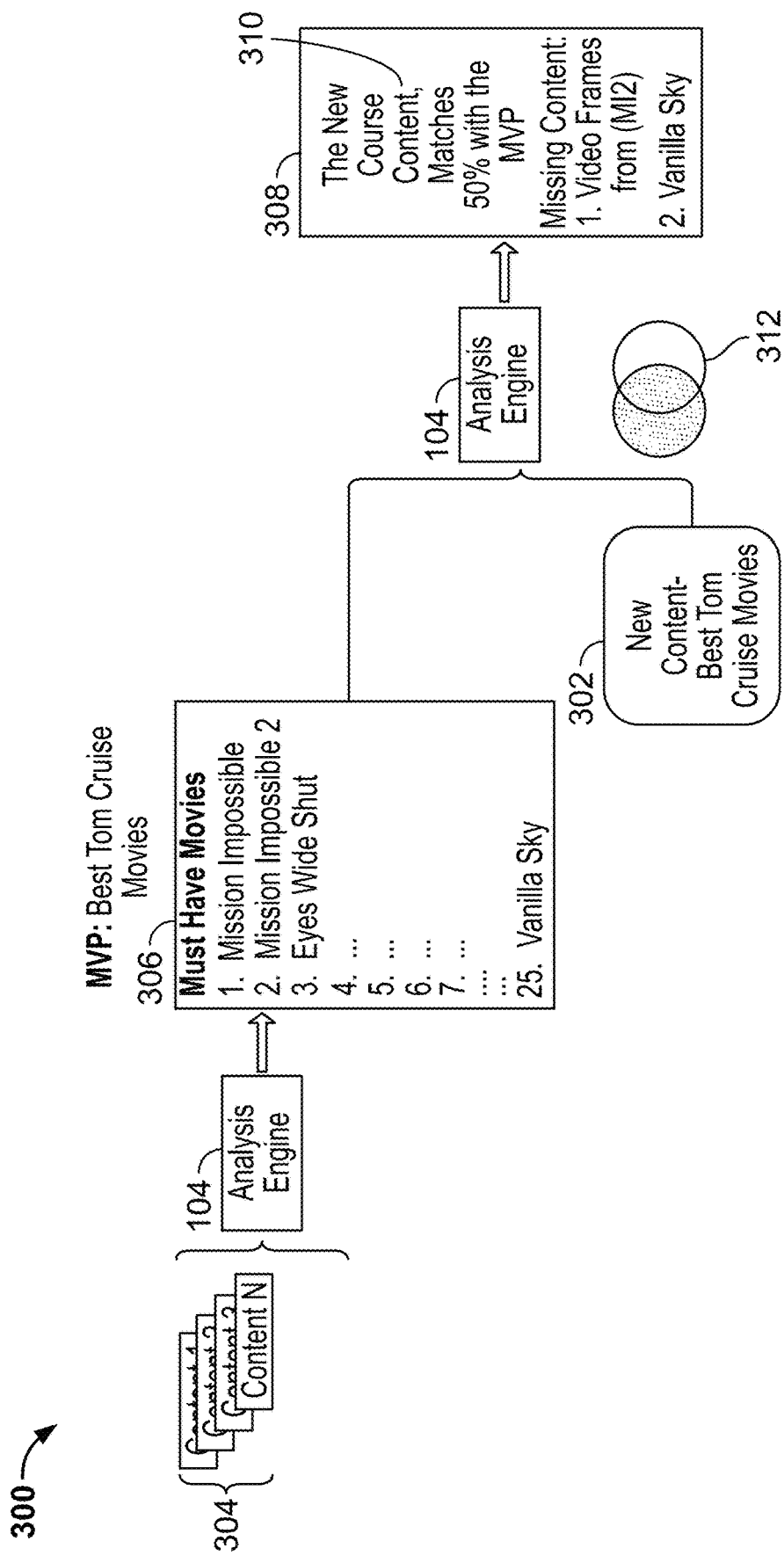
FIG. 3 shows an illustrative diagram for making a recommendation to modify a new content item to include portions with omitted content, in accordance with some embodiments of the disclosure.

FIG. 3 shows an illustrative diagram 300 for making a recommendation to modify a new content item to include portions with omitted content, in accordance with some embodiments of the disclosure. As shown, new content item 302 is a collection of "the best Tom Cruise movies." As similarly described above with reference to FIGS. 1 and 2, the analysis engine 104 may analyze a plurality of content items 304 having collections of the best Tom Cruise movies to identify and rank the games in the plurality of content items 304. Based on the identified and ranked movies, the analysis engine 104 may identify movies to include in the MVP 306 (i.e., the movies that should be included in any content item about the best Tom Cruise movies). For example, as shown, the MVP 306 may include the following movies: "Mission Impossible," Mission Impossible 2," Eyes Wide Shut," . . . and "Vanilla Sky").

The analysis engine 104 may compare the MVP 306 to identified movies in the new content item 302 and generate a recommendation 308 based on the comparison. For example, as shown, if the analysis engine 104 determines that the new content item 302 does not include certain video frames from "Mission Impossible" or any content from "Vanilla Sky," the analysis engine 104 may include these missing portions in the recommendation 308. In some embodiments, the recommendation 308 may include additional information 310 (e.g., "the new content matches with 50% of the MVP content"). In some embodiments, the additional information 310 may be represented by an illustration (e.g., a Venn diagram 312 showing the overlap between the new content item 302 and the MVP 306).

Figure 4A:
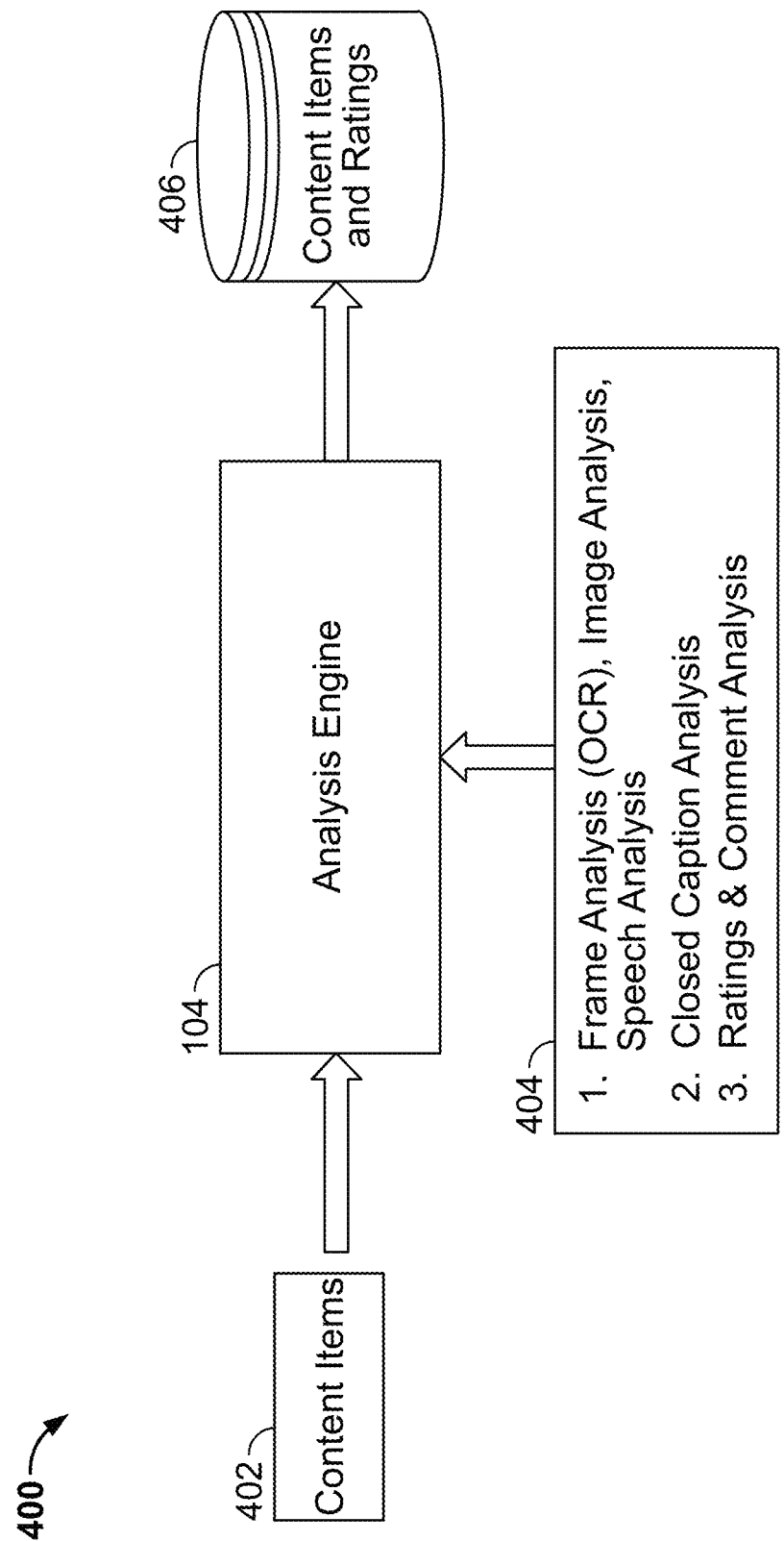
FIG. 4A and FIG. 4B show illustrative diagrams for identifying and ranking sub-topics in content items, in accordance with some embodiments of the disclosure.

FIG. 4A shows an illustrative diagram 400 for identifying and ranking sub-topics in content items, in accordance with some embodiments of the disclosure. For example, the illustrative diagram 400 may correspond to the generation of the table (MVP 112) described above in FIG. 1. As shown, content items 402 may be input in/retrieved by the analysis engine 104. The analysis engine 104 may use identification and rating information and tools 404 to identify and rate each of the sub-topics included in the content items 402. For example, the analysis engine 104 may use frame analysis (e.g., optical character recognition), image analysis, speech analysis, close caption analysis, etc. to convert content in each of the content items 402 to a machine readable format and parse the content to identify the sub-topics in each of the content items. The analysis engine 104 may use ratings and comment analysis to rank each of the identified sub-topics. The analysis engine 104 may store the rated sub-topics in sub-topics and ratings database 406.

Figure 4B:
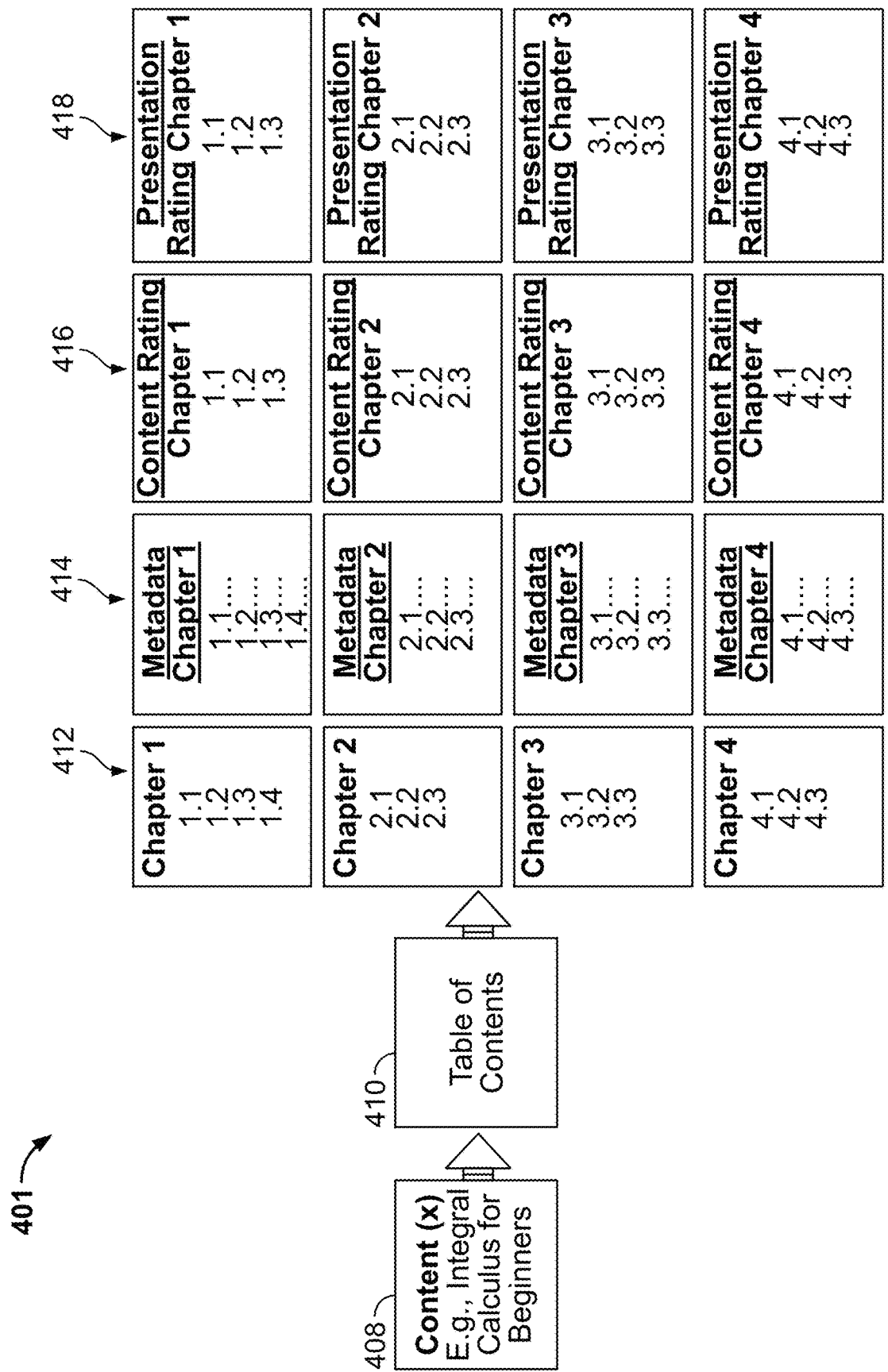

FIG. 4B shows an illustrative diagram 401 for identifying and ranking sub-topics in a content item, in accordance with some embodiments of the disclosure. For example, the illustrative diagram 401 may be a detailed diagram of identifying and ranking sub-topics in one of the content items 402 in FIG. 4A. As shown, the analysis engine 104 may parse content 408 of the content item 402 and identify a topic of the content item (e.g., "integral calculus for beginners"). The analysis engine 104 may identify a table of content 410 in the content 408. In some embodiments, if the content 408 does not include a table of contents, the analysis engine 104 may analyze the content 408 and generate the table of contents 410. For example, the analysis engine 104 may identify keywords in each of a plurality of portions of the content 408 and compare the identified keywords with keywords stored in a database of keywords associated with a plurality of sub-topics and identify, based on the comparison, a plurality of sub-topics to include in the table of contents 410. As shown, the analysis engine 104 may divide the content 408 into a plurality of chapters 412 (e.g., "chapter 1," "chapter 2," "chapter 3," and "chapter 4") based on the table of contents 410. In some embodiments, the analysis engine 104 may further divide content in each of the plurality of chapters into sub-chapters (e.g., "1.1," "1.2," "1.3," "2.1," etc.). Although FIG. 4B shows the content 408 being divided into a plurality of chapters 412, this is only an example and the analysis engine 104 may divide the content 408 into any suitable structure (e.g., a tree structure) that groups content into sub-contents.

As shown, the analysis engine 104 may generate metadata 414 for each of the plurality of chapters 412. The metadata 414 may be stored with the plurality of chapters 412 in the sub-topics and ratings database 406. The analysis engine 104 may calculate a content rating 416 to each of the plurality of chapters 412. As explained in further detail in FIG. 5A, the content ratings 416 may be calculated based on ratings (e.g., user ratings) retrieved from a variety of sources. In some embodiments, the analysis engine 104 may assign a same rating to each of the plurality of chapters 412 based on an overall rating of the content item 402, or individual ratings for each of the plurality of chapters 412 based on individual ratings for each of the chapters. For example, referring to back to FIG. 1, if the content item 402 corresponds to "course one" 106a, the analysis engine 104 may assign the same rating of "8" (e.g., the overall rating for course one 106a) to each of the identified sub-topics. If the content item 402 corresponds to "course two" 106b, the analysis engine 104 may assign individuals ratings (e.g., "7," "6," "5," and "5") to each of the respective identified sub-topics.

In some embodiments, the analysis engine may calculate a presentation rating 418 for each of the plurality of chapters 412. The presentation rating 418 may correspond to how the content is presented (e.g., inadequate illustrations, typos, poor formatting, etc.). In some embodiments, the presentation rating 418 is calculated based on consumer ratings. However, this is only an example, and the presentation rating 418 may also be based on a number of other factors (e.g., image analysis, machine learning, OCR, etc.).

Figure 5A:
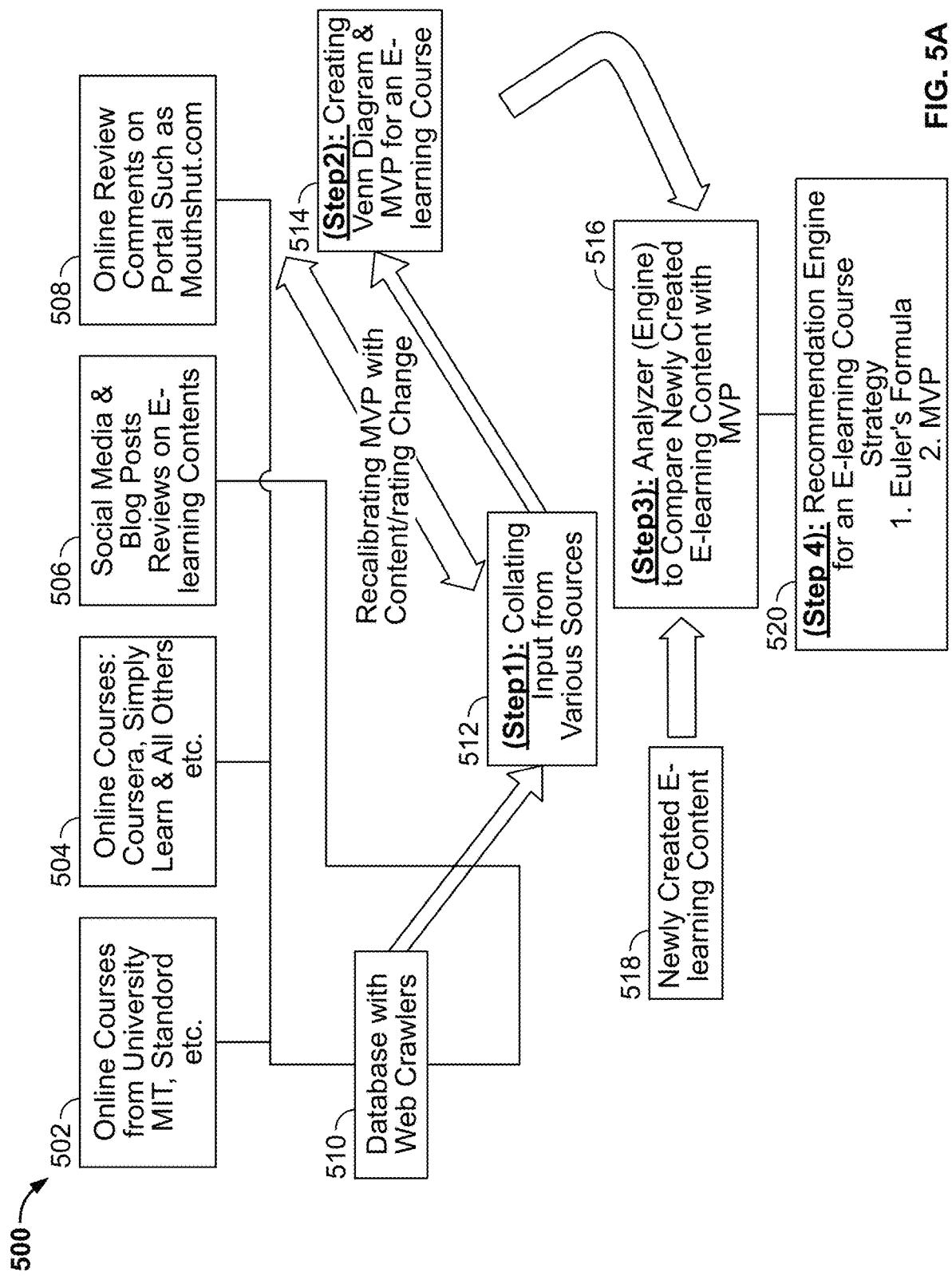
FIG. 5A shows an illustrative diagram for generating an MVP for an electronic learning ("e-learning") course about a particular topic and a recommendation for a new e-learning course about the particular topic, in accordance with some embodiments of the disclosure.

FIG. 5A shows an illustrative diagram 500 for generating an MVP for an electronic learning ("e-learning") course about a particular topic and a recommendation for a new e-learning course about the particular topic, in accordance with some embodiments of the disclosure. In some embodiments, the analysis engine 104 may build a database 510 of content items about the particular topic (e.g., integral calculus for beginners) and ratings using web crawlers. For example, as shown, the web crawlers may retrieve content items and ratings from a plurality of sources such as online courses from universities 502, and online courses from e-learning platforms 504. The web crawlers may also retrieve ratings from social media and blogs 506 and from online reviews on certain online review portals 508. However, these are only examples, and the web crawlers may retrieve content items and ratings from a variety of sources. In step 512, the analysis engine 104 may collate the retrieved information in the database 510, and create, in step 514, the MVP for the e-learning course about the particular topic as described in greater detail above. In step 516, the analysis engine 104 may a newly created e-learning course 518 with the MVP to, e.g., identify content that is not included in the newly created e-learning course 518. In step 520, the analysis engine 104 may generate a recommendation to modify the newly created e-learning course 518, based on the comparison in step 516 (e.g., utilizing the MVP). In some embodiments, the analysis engine 104 may utilize Euler's formula to identify omitted content in the newly created e-learning course 518.

Figure 5B:
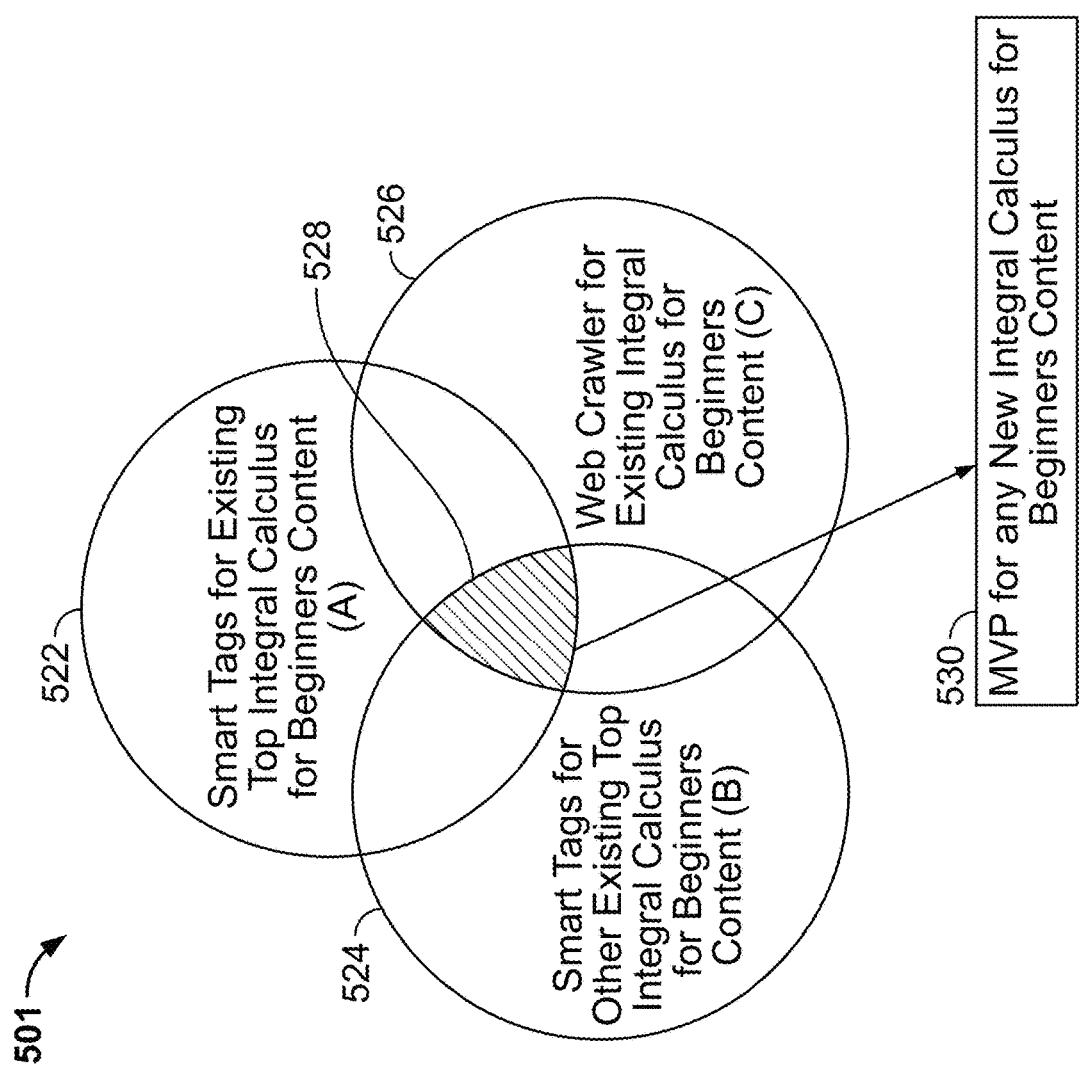
FIG. 5B shows an illustrative diagram of a Venn diagram for generating and updating MVP content for the particular topic in FIG. 5A, in accordance with some embodiments of the disclosure.

FIG. 5B shows an illustrative diagram 501 of a Venn diagram for generating and updating MVP content for the particular topic in step 514 of FIG. 5A, in accordance with some embodiments of the disclosure. For example, as shown, the analysis engine 104 may compare smart tags for existing top integral calculus for beginners content (A) 522, smart tags for other existing top integral calculus for beginners content (B) 524, and results from the web crawler for exiting integral calculus for beginners content (C) 526 to identify common content 528 (e.g., as illustrated by the Venn diagram illustrated in FIG. 5B). Based on the identified common content 528, the analysis engine 104 may generate/update the MVP 530 for any new integral calculus for beginners content.

Figure 6:
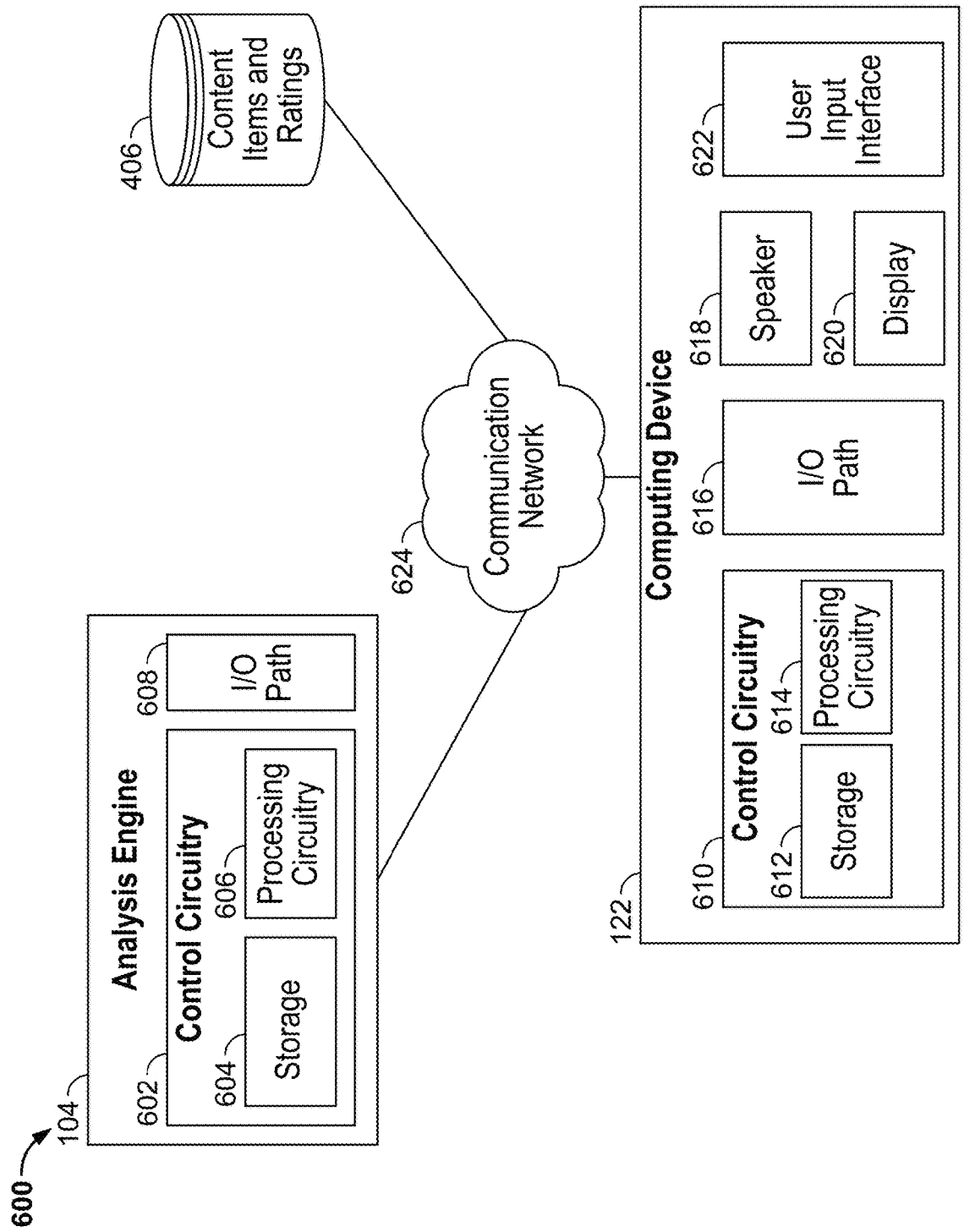
FIG. 6 shows an illustrative block diagram of a system an analysis engine, a computing device, and the sub-topics and ratings database, in accordance with some embodiments of the disclosure.

FIG. 6 shows an illustrative block diagram of a system 600 including the above-described analysis engine 104, computing device 122, and sub-topics and ratings database 406, in accordance with some embodiments of the disclosure. Although FIG. 6 shows certain numbers of components, in various examples, the system 600 may include fewer than the illustrated components and/or multiples of one or more illustrated components. The analysis engine 104 includes control circuitry 602 and an I/O path 608, and the control circuitry 602 includes a storage 604 and processing circuitry 606. The I/O path 608 may include circuitry (e.g., a transceiver) configured to perform I/O functions. The computing device 122, which may correspond to a device of a content creator described in FIG. 1 (e.g., a user), includes control circuitry 610, an I/O path 616, a speaker 618, a display 620, and a user input interface 622. The control circuitry 610 includes a storage 612 and processing circuitry 614. The control circuitry 602 and/or 610 may be based on any suitable processing circuitry, such as the processing circuitry 606 and/or 614. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of the storage 604, the storage 612, and/or storages of other components of system 600 (e.g., sub-topics and ratings database 406) may be an electronic storage device. As referred to herein, the phrase "electronic storage device" or "storage device" should be understood to mean any device for storing electronic data, computer software, or firmware. Each of the storage 604, the storage 612, and/or storages of other components of system 600 may be used to store various types of content items, content, metadata, and ratings, and or other types of data. Non-volatile memory may also be used (e.g., to launch a boot-up routine and other instructions). Cloud-based storage may be used to supplement storages 604, 612 or instead of storages 604, 612. In some embodiments, the control circuitry 602 and/or 610 executes instructions for an application stored in memory (e.g., the storage 604 and/or 612). Specifically, the control circuitry 602 and/or 610 may be instructed by an application to perform the functions discussed herein. In some implementations, any action performed by the control circuitry 602 and/or 610 may be based on instructions received from the application. For example, the application may be implemented as software or a set of executable instructions that may be stored in the storage 604 and/or 612 and executed by the control circuitry 602 and/or 610. In some embodiments, the application may be a client/server application where only a client application resides on the computing device 122, and a server application resides on the analysis engine 104.

The application may be implemented using any suitable architecture. For example, it may be a stand-alone application wholly implemented on the analysis engine 104 or the computing device 122. In client/server-based embodiments, the control circuitry 610 may include communication circuitry suitable for communicating with an application server (e.g., the analysis engine 104) or other networks or servers. The instructions for carrying out the functionality described herein may be stored on the application server. The communication circuitry may include a cable modem, an integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 624). In another example of a client/server-based application, control circuitry 610 runs a web browser that interprets web pages provided by a remote server (e.g., the analysis engine 104). For example, the remote server may store the instructions for the application in a storage device. The remote server may process the stored instructions using circuitry (e.g., the control circuitry 602) and generate the displays discussed above and below. The computing device 122 may receive the displays generated by the remote server and may display the content of the displays locally via the display 620. This way, the processing of the instructions is performed remotely (e.g., by the analysis engine 104) while the resulting displays, such as the display windows described elsewhere herein, are provided locally on the computing device 122. The computing device 122 may receive inputs from the user via the user input interface 622 and transmit those inputs to the remote server for processing and generating the corresponding displays.

Figure 7:
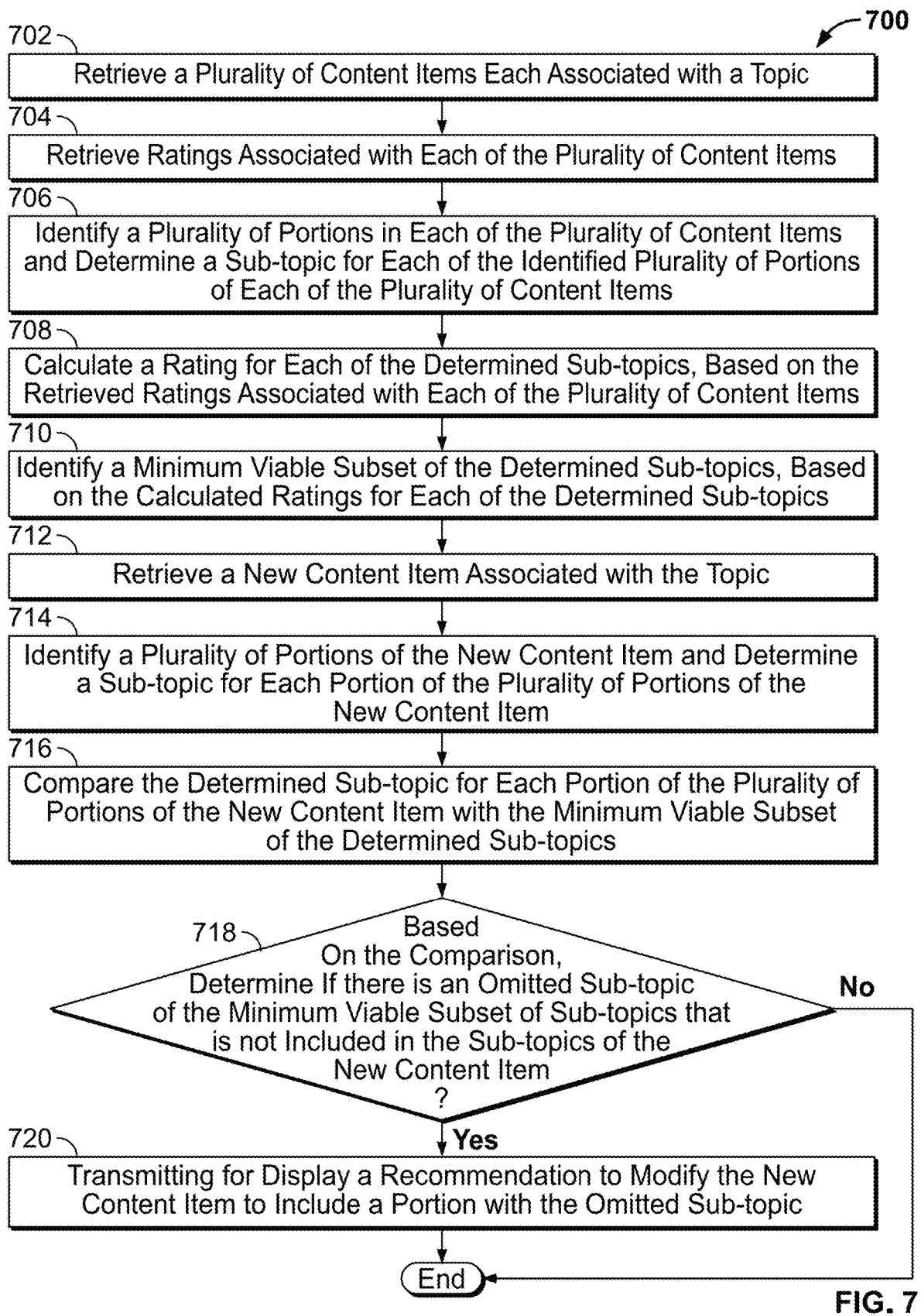
FIG. 7 shows an illustrative flowchart of a process 700 for making a recommendation to modify a new content item to include a portion with an omitted sub-topic that may be implemented using the, in accordance with some embodiments of the disclosure.

Having described the system 600, reference is now made to FIG. 7, which depicts an illustrative flowchart of a process 700 for making a recommendation to modify a new content item to include a portion with an omitted sub-topic that may be implement using the system 600, in accordance with some embodiments of the disclosure. In various embodiments, individual steps of the process 700, or any process described herein, may be implemented by one or more components of the system 600. Although the disclosure may describe certain steps of the process 700 (and of other processes described herein) as being implemented by certain components of system 600, this is for purposes of illustration only, and it should be understood that other components of system 600 may implement those steps instead.

At 702, the analysis engine 104, by the control circuitry 602 (e.g., via the I/O path 608), may retrieve a plurality of content items each associated with a topic (e.g., the same topic). In some embodiments, the analysis engine 104 may retrieve the plurality of content items from a database or using web crawlers.

At 704, the analysis engine 104, by the control circuitry 602 (e.g., via the I/O path 608), may retrieve ratings associated with each of the plurality of content items. In some embodiments, ratings may be retrieved from a website hosting the corresponding content item. In some embodiments, ratings may be retrieved from a website that is not hosting the corresponding content item At 706, the analysis engine 104, by the control circuitry 602, may identify a plurality of portions in each of the plurality of content items and determine a sub-topic for each of the identified plurality of portions of each of the plurality of content items. For example, the analysis engine 104 may identify the plurality of portions of a content item and determine the sub-topics based on a table of contents associated with the content item.

At 708, the analysis engine 104, by the control circuitry 602, may calculate a rating for each of the determined sub-topics, based on the retrieved ratings associated with each of the plurality of content items. In some embodiments, the analysis engine 104 may normalize the ratings across all of the determined sub-topics.

At 710, the analysis engine 104, by the control circuitry 602, may identify a minimum viable subset of the determined sub-topics (e.g., the minimum viable product), based on the calculated ratings for each of the determined sub-topics. For example, the analysis engine 104 may determine the sub-topics should be included in any new content item about the topic.

At 712, the analysis engine 104, by the control circuitry 602 (e.g., via the I/O path 608), may retrieve a new content item associated with the topic. For example, a content creator of the new content item may upload the new content item to the analysis engine 104 by the computing device 122 (e.g., via the communication network 624). In some embodiments, this upload may be an attempted upload to a server (e.g., to be available to a plurality of other users) that may be interrupted if the new content item is missing content (e.g., based on the determination at 718 described below).

At 714, the analysis engine 104, by the control circuitry 602, may identify a plurality of portions of the new content item and determine a sub-topic for each portion of the plurality of portions of the new content item. For example, the analysis engine 104 may identify the plurality of portions of a content item and determine the sub-topics based on a table of contents associated with the content item.

At 716, the analysis engine 104, by the control circuitry 602, may compare the determined sub-topic for each portion of the plurality of portions of the new content item with the minimum viable subset of the determined sub-topics.

At 718, the analysis engine 104, by the control circuitry 602, may determine, based on the comparison at 716, whether there is an omitted sub-topic of the minimum viable subset of sub-topics that is not included in the sub-topics of the new content item. For example, the analysis engine 104 may determine if there is a sub-topic that should have been included in the new content item. If the analysis engine 104 determines that there is an omitted sub-topic ("Yes" at 718), the process 700 may proceed to 720. Otherwise, ("No" at 718), the process 700 may end.

At 720, the analysis engine 104, by the control circuitry 602 (e.g., via the I/O path 608), may transmit for display (e.g., to the computing device 122), a recommendation to modify the new content item to include a portion with the omitted sub-topic. In some embodiments, the analysis engine 104 may also interrupt the upload of the new content item until the new content item is modified to include the portion with the omitted sub-topic.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method, comprising:
receiving, by a computing device, a first request to post a first content item about a topic, wherein the computing device makes posts of content items available to a plurality of devices via a network;
accessing a database of the computing device that stores a plurality of second content items directed to the topic;
analyzing, using a machine learning model, the plurality of second content items that are directed to the topic to determine a plurality of required sub-topics;
determining the first content item is missing a sub-topic of the plurality of required sub-topics;
based at least in part on determining the first content item is missing the required sub-topic, rejecting the first request to post the first content item;
receiving a second request to post a modified first content item; and
posting the modified first content item, based at least in part on determining that the modified first content item includes the missing required sub-topic.

2. The method of claim 1, wherein analyzing the plurality of second content items comprises parsing a plurality of online reviews.

3. The method of claim 2, wherein the first content item is an online review.

4. The method of claim 1, wherein the machine learning model comprises a neural net.

5. The method of claim 1, wherein the plurality of required sub-topics are included in a majority of the plurality of second content items.

6. The method of claim 1, wherein the plurality of required sub-topics are determined using a subset of the plurality of second content items having a rating above a threshold.

7. The method of claim 1, wherein:
analyzing the plurality of second content items comprises identifying keywords in each of the plurality of second content items; and
determining the first content item is missing a sub-topic of the plurality of required sub-topics comprises determining the first content item is missing a keyword of the identified keywords.

8. The method of claim 1, wherein:
the first request is to post the first content item to an online review portal; and
the computing device makes posts of content items available to a plurality of devices via the online review portal.

9. The method of claim 8, wherein the plurality of second content items are posts to the online review portal.

10. The method of claim 1, further comprising transmitting for display a recommendation to modify the first content item to include the missing required sub-topic.

11. A system, comprising:
transceiver circuitry configured to:
receive a first request to post a first content item about a topic, wherein the system makes posts of content items available to a plurality of devices via a network; and
control circuitry configured to:
access a database of the system that stores a plurality of second content items directed to the topic;
analyze, using a machine learning model, the plurality of second content items that are directed to the topic to determine a plurality of required sub-topics;
determine the first content item is missing a sub-topic of the plurality of required sub-topics; and
based at least in part on determining the first content item is missing the required sub-topic, reject the first request to post the first content item;
wherein the transceiver circuitry is further configured to:
receive a second request to post a modified first content item; and
post the modified first content item, based at least in part on determining that the modified first content item includes the missing required sub-topic.

12. The system of claim 11, wherein the control circuitry is configured to analyze the plurality of second content items by parsing a plurality of online reviews.

13. The system of claim 12, wherein the first content item is an online review.

14. The system of claim 11, wherein the machine learning model comprises a neural net.

15. The system of claim 11, wherein the plurality of required sub-topics are included in a majority of the plurality of second content items.

16. The system of claim 11, wherein the plurality of required sub-topics are determined using a subset of the plurality of second content items having a rating above a threshold.

17. The system of claim 11, wherein the control circuitry is further configured to:
analyze the plurality of second content items by identifying keywords in each of the plurality of second content items; and
determine the first content item is missing a sub-topic of the plurality of required sub-topics by determining the first content item is missing a keyword of the identified keywords.

18. The system of claim 11, wherein:
the first request is to post the first content item to an online review portal; and
the transceiver circuitry makes posts of content items available to a plurality of devices via the online review portal.

19. The system of claim 18, wherein the plurality of second content items are posts to the online review portal.

20. The system of claim 11, wherein the control circuitry is further configured to transmit for display a recommendation to modify the first content item to include the missing required sub-topic.

* * * * *